United States Patent [19]

Bell

[11] Patent Number: 4,765,522

[45] Date of Patent: Aug. 23, 1988

[54] LUGGAGE CARRIER

[75] Inventor: James C. Bell, Stratford, Conn.

[73] Assignee: Oliver Industries, Inc., North Haven, Conn.

[21] Appl. No.: 22,784

[22] Filed: Mar. 6, 1987

[51] Int. Cl.[4] .................................. B60R 9/04
[52] U.S. Cl. ................................ 224/326; 224/325
[58] Field of Search ............... 224/309, 310, 321, 324, 224/325, 326; 410/101

[56] References Cited

U.S. PATENT DOCUMENTS

| 3,102,708 | 9/1963 | Crain | 224/273 X |
| 3,838,802 | 10/1974 | Grycel, III | 224/309 |
| 4,174,794 | 11/1979 | Bott | 224/325 X |
| 4,266,708 | 5/1981 | Bott | 224/324 X |
| 4,432,478 | 2/1984 | Bott | 224/326 X |
| 4,440,333 | 4/1984 | Bott | 224/324 |
| 4,460,116 | 7/1984 | Bott | 224/324 |
| 4,616,772 | 10/1986 | Mareydt | 224/326 |

Primary Examiner—Henry J. Recla
Assistant Examiner—Robert Petrik
Attorney, Agent, or Firm—McCormick, Paulding and Huber

[57] ABSTRACT

A luggage carrier has several spaced parallel slat assemblies, and end caps for all of the slats. The outermost slat assemblies are also fitted with tie-down cleats that do not require screw fasteners to anchor them to the slats. These tie-down cleats are trapped between the end cap and a load bearing rail in the slat's center groove.

4 Claims, 4 Drawing Sheets

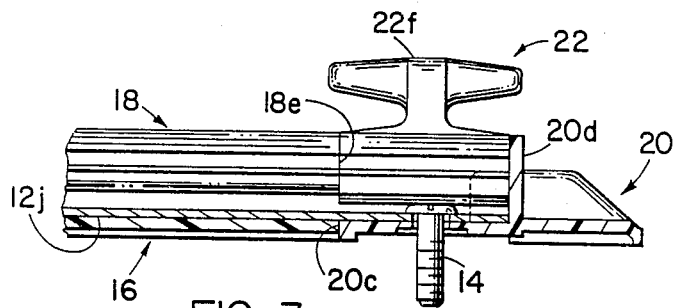
FIG. 3
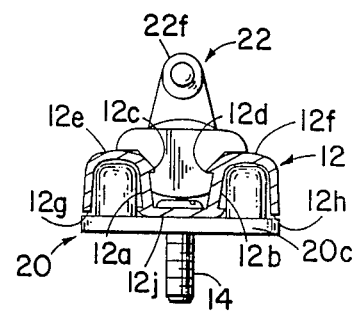
FIG. 5
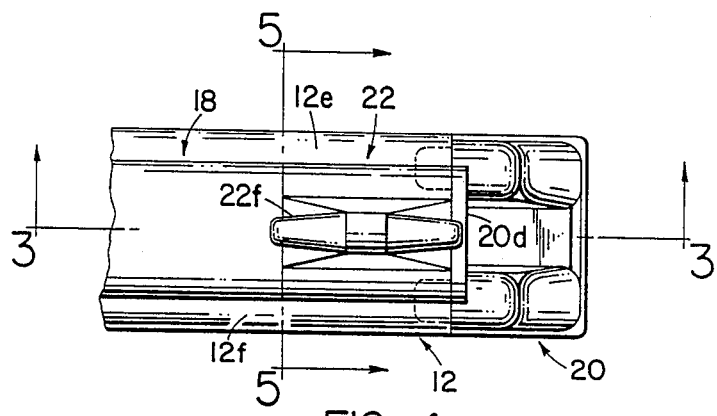
FIG. 4
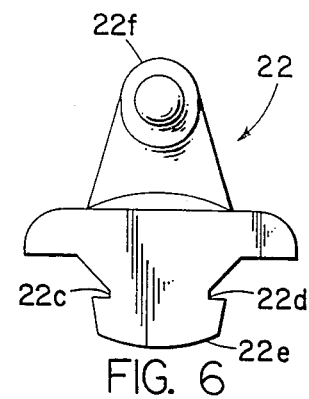
FIG. 6
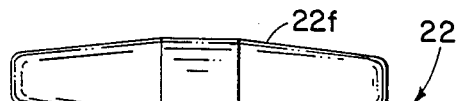
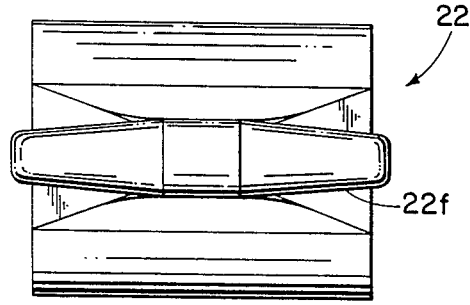
FIG. 7
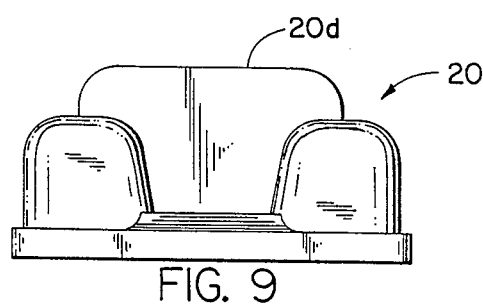
FIG. 9
FIG. 8 ced in place between the end cap and strip without the need for additional screws.

LUGGAGE CARRIER

BACKGROUND OF THE INVENTION

This invention relates generally to luggage racks or carriers capable of supporting articles on a generally horizontally extending surface of an automotive vehicle.

Prior art luggage racks or carriers generally include one or more cross rails associated with the article supporting slat assemblies secured to a vehicle surface, and may include upright stanchions at one or both ends of the outside slat assemblies and/or tie downs where no cross rail is to be provided. For such prior art tie downs the reader is referred to the following prior art patents as representative:

| U.S. Pat. No. 4,015,760 | U.S. Pat. No. 4,427,141 |
| U.S. Pat. No. 4,055,284 | U.S. Pat. No. 4,431,123 |
| U.S. Pat. No. 4,174,794 | U.S. Pat. No. 4,440,333 |

The purpose of the present invention is to provide an improved article carrier, and more particularly to provide an improved slat assembly therefor, the slat assembly includes complementary end cap and rub rail components that are designed to fit into the slat element with or without a tie-down cleat therebetween. While the slat element and end cap are secured to the vehicle by a screw fastener, no fastener screw is required for the tie-down cleat.

SUMMARY OF THE INVENTION

The article carrier of the present invention comprises a plurality of slat assemblies each of which is fabricated from an extruded aluminum slat element characterized by an upwardly open central groove and symmetrically arranged load supporting inverted U-shaped portions intregrally connected to a bottom wall of the groove. Elongated downwardly open cavities are defined by these U-shaped portions, and lower edges of the inverted U-shaped portions are coplanar with the bottom wall of the groove. Metal slat element includes longitudinally extending opposed ribs defined by the otherwise upwardly divergent side walls of the central groove and these ribs cooperate with grooves provided for this purpose in an elastomeric strip that is adapted to be slidably received in the groove and to provide a protective surface for the luggage being carried. The strip and slat element spread the weight of the luggage on the vehicle surface for the purpose of protecting the surface itself. A gasket material is preferably provided between the bottom wall and lower end portions of the U-shaped portions of the metal slat to further protect the vehicle surface from the extruded metal slat element. End caps are provided for the end portions of the extruded metal slat element and each end cap includes portions received in the downwardly open cavities, and further includes a lower portion of approximately the same thickness as the gasket materials so as to be received beneath the bottom wall of the extruded slat in order that a single screw can be provided to secure the slat and end cap to the vehicle surface.

In accordance with the present invention a one piece plastic tie down cleat is provided adjacent the end portions of the slats and is slidably received in the upwardly open central groove of the slat element so as to be se-

BRIEF DESCRIPTION OF THE DRAWINGS

FIG. 3 is a vertical sectional view through the assembled components of FIG. 2.

FIG. 4 is a top plan view of the assembly illustrated in FIG. 3.

FIG. 5 is a vertical section taken generally on the line 5, 5 of FIG. 4 (FIG. 3 being a section taken generally on the line of 3, 3 of FIG. 4).

FIG. 6 is an end view of the tie down cleat.

FIG. 7 is a side elevational view of the tie down cleat.

FIG. 8 is a top plan view of the tie down cleat.

FIG. 9 is an end elevation of the end cap.

DETAILED DESCRIPTION OF THE DRAWINGS

Figure 1:
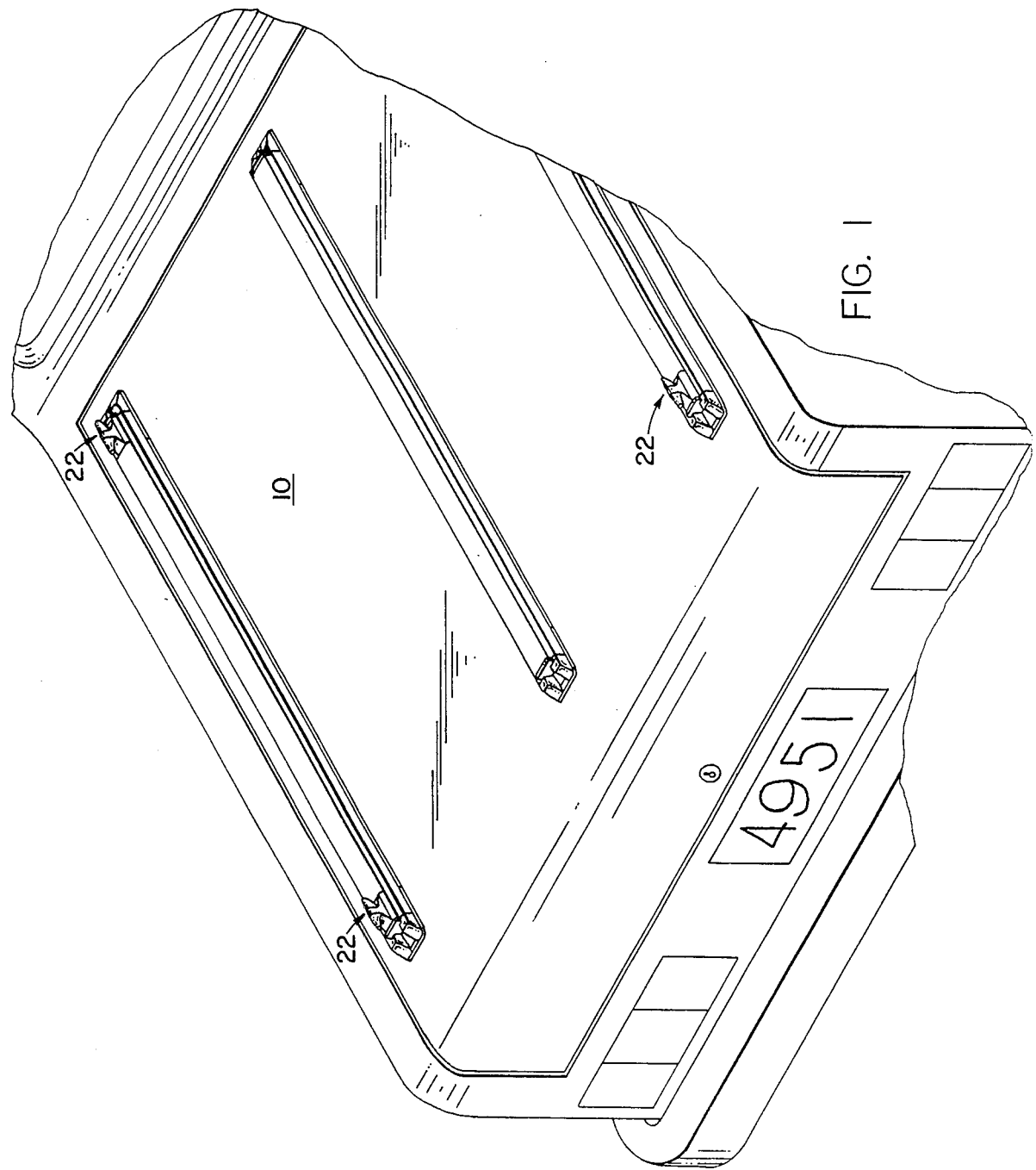
FIG. 1 is a perspective view illustrating an article carrier constructed in accordance with the present invention as mounted to the rear deck of an automotive vehicle.

Turning now to the drawings in greater detail, FIG. 1 shows the rear deck of a typical automotive vehicle having a generally horizontally extending surface 10 to which a luggage carrier of the present invention is adapted to be secured.

As shown in FIG. 1 several slat assemblies are provided on the vehicle surface and extend longitudinally of the vehicle and parallel to one another to define the luggage carrier in its assembled configuration.

The luggage carrier comprises a plurality of slat assemblies at least two of which, preferably the outside slat assemblies, are equipped with a tie down cleat in accordance with the present invention.

Figure 2:
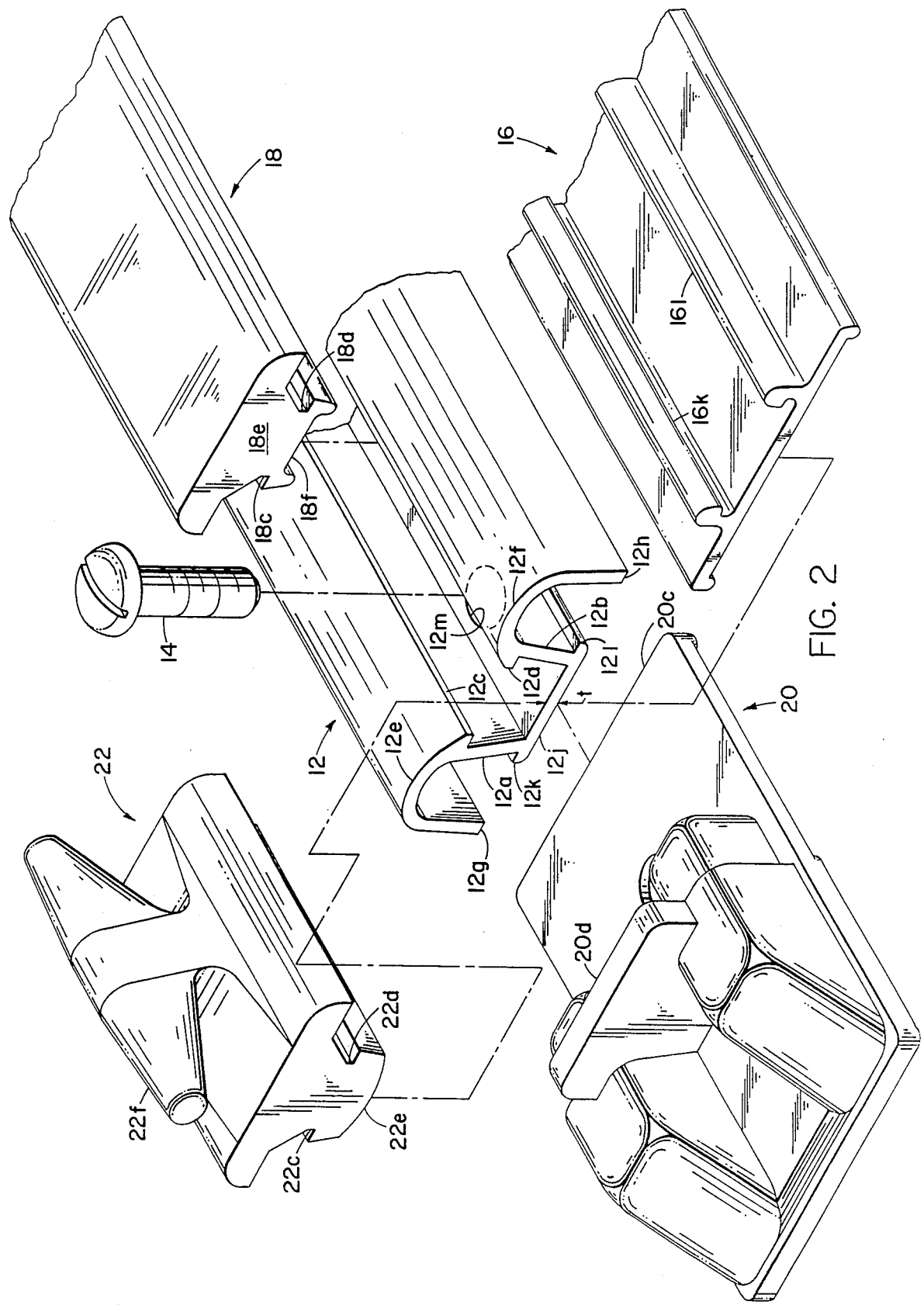
FIG. 2 is an exploded perspective view with varous components associated with one end of one slat assembly such as illustrated in FIG. 1.
Figure 11:
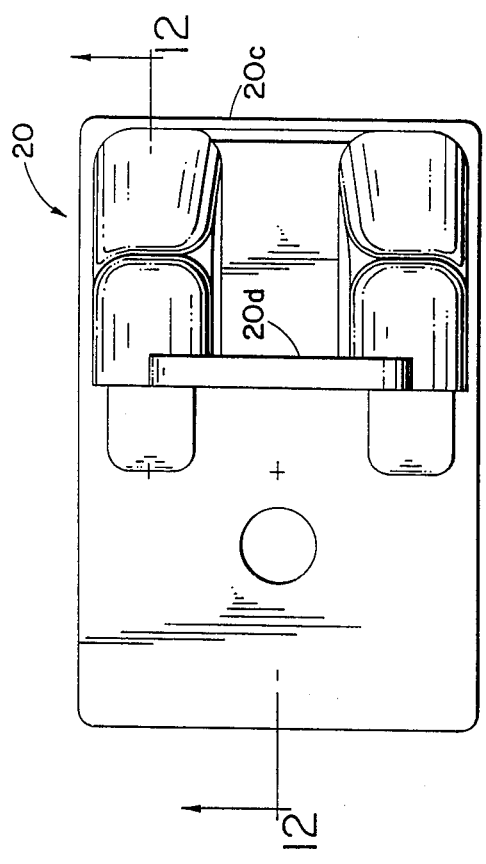
FIG. 11 is a top plan view of the end cap.
Figure 12:
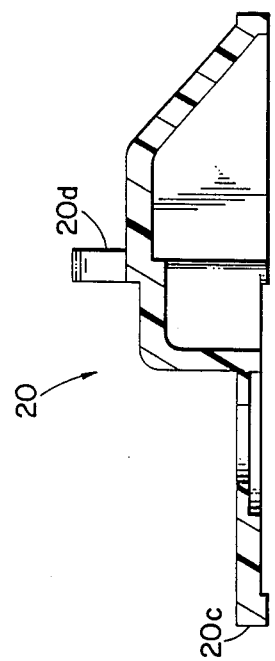
Figure 10:
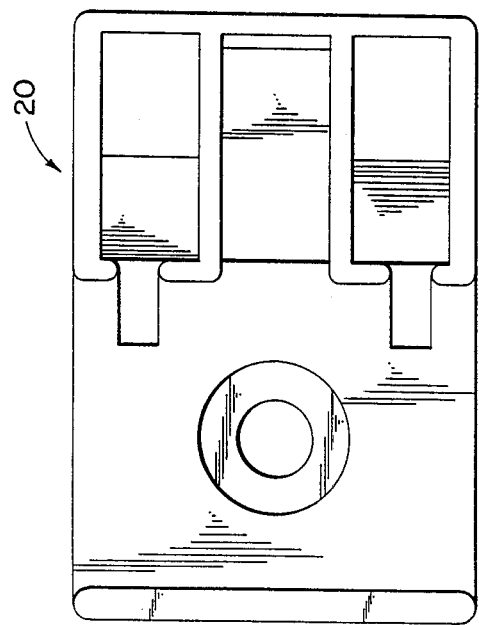
FIG. 10 is a vertical section taken on the line 10, 10 of FIG. 9.

Referring now to FIG. 2, an end portion of one such slat assembly is there shown with its various components in exploded relationship to one another. Each of the outside slat assemblies includes an elongated extruded slat element 12 preferably fabricated from aluminum so as to be conveniently cut to the proper length to provide a luggage carrier of predetermined dimensions. The slat element 12 is adapted to be secured to the vehicle surface by fastening means in the form of screw 14 one of which screws is provided adjacent each end the metal slat 12. A thermoplastic gasket element 16 is preferably provided between the lower edges of the extruded slat element 12 and the vehicle surface.

The slat element 12 has a lateral cross-sectional shape characterized by an upwardly open elongated central groove. The groove is defined by generally divergent side walls 12a and 12b. Each of these side walls defines an elongated rib 12c and 12d respectively, which ribs are arranged opposite one another relative to the central groove and define downwardly facing flanges of lateral width no greater than the thickness t of the extrusion itself. Thus, the ribs 12c and 12d are so shaped as to receive the vinyl strip 18 as a result of the fact that that the strip 18 has complementary shaped grooves 18c and 18d that are adapted to receive the ribs 12c and 12d in the slat element. It will be apparent that the slat and strip, 12 and 18 respectively are of complimentary shape so that the rail can be slidably assembled with the slat to provide a load bearing surface for supporting the articles to be carried.

Still with reference to the slat element 12, load bearing portions are defined by inverted U-shaped portions of the slat element as indicated generally at 12e and 12f. These load bearing or support portions 12e and 12f, of the slat element define the upper portions of downwardly open elongated cavities symmetrically arranged on either side of the longitudinally extending slat element. The lower edges 12g and 12h of these load support portions of the slat element are arranged in a common plane with the lower surface of the bottom wall 12j of the slat element and it will be apparent that the thickness t of the extruded slat element is relatively constant except in the area of the ribs 12c and 12d referred to previously. The bottom wall 12j defines the lower boundary of the central groove and has marginal portions 12k and 12l extending laterally outwardly into the downwardly open cavities of the slat element for receiving complementary shaped portions 16k and 16l of the plastic gasket 16 referred to previously.

Thus, both the gasket 16 and the elastomeric strip 18 are slidably received in or on the extruded slat element 12 to provide a subassembly well adapted to support relatively heavy articles in the form of luggage at a suitable horizontally extending surface on an automotive vehicle.

In order to provide means for securing these luggage articles to the carrier and to improve the appearance of the end portions of the slat assemblies I have provided end caps such as that shown at 20 in FIG. 2. Each end cap includes laterally spaced portions that are adapted to be received in the downwardly open cavities of the slat, and further includes a lowermost portion 20c that is of approximately the same thickness as the gasket 16, and which lowermost portion 20c includes an opening alignable with an opening 12m in the bottom wall of the slat element 12 so that a single screw fastener 14 can secure both the end cap and the slat to the vehicle surface.

Each end cap 20 further includes a stop wall or abutment 20d adapted to engage the end of the slat 12. In the two outside slat assemblies this end cap abutment 20d cooperates with the end 18e of the elastomeric strip to define a gap therebetween for receiving a one piece integrally formed tie-down cleat 22 to be described. Alternatively, this abutment 20d may be provided adjacent the strip end if no tie-down cleat is to be provided.

In the two outside slat assemblies the space between the strip end 18e and the abutment 20d serves to trap the cleat 22 between it and the strip 18, and also serves to close the end of the slat in such a manner that an aesthetically pleasing appearance is provided when the luggage carrier is assembled on a vehicle as shown in FIG. 1.

The tie-down cleat 22 has a base with a cross-sectional configuration somewhat similar to that of the rail 18, and more particularly the base of the cleat 22 includes a longitudinally extending groove 22c and 22d on each side. These grooves 22c and 22d receive the ribs 12c and 12d provided for this purpose in the slat 12 to secure the tie down 22 in place without any necessity for a screw fastener or the like.

The lowermost surface 22e of the cleat 22 is preferably convex, as opposed to the concave lowermost surface 18f of the strip 18, such that the plastic material from which the cleat is molded will not tend to compress when an upwardly directed load is imposed on the upper portion 22f of the cleat 22, as when an article is to be secured to the carrier. The aforesaid upper portion 22f of the cleat 22 is preferably formed in the shape of an upright T with portions extending parallel the longitudinal direction of the slat for receiving conventionally configured tie down straps most useful in securing articles to the carrier.

As so constructed and arranged several slat assemblies can be provided on a vehicle surface and end caps provided in the ends of some slats and tie-down cleats provided with said end caps in the outermost slat assemblies.

I claim:

1. An article carrier for use on a generally horizontally disposed surface of an automotive vehicle, said carrier comprising:

at least two spaced parallel elongated slat elements fixedly secured to the vehicle surface, each slat element having a lateral cross-sectional shape characterized by an upwardly open elongated central groove with downwardly divergent side walls of thickness t and a generally flat elongated bottom wall also of thickness t, said side walls having integrally defined elongated slat ribs that are arranged opposite one another, each rib defining a downwardly facing flange of lateral width no greater than said thickness t, and each slat element further including laterally opposed downwardly open elongated cavities defined by symmetrical load support U-shaped portions of said slat element said load support portions being integrally connected to and partially defining said side walls, an elongated elastomeric strip having an upper portion overlying said load support slat portions and a lower portion slidably received in said slat groove said lower portion having symmetrically arranged longitudinally extending strip grooves to receive said slat ribs, and said strip grooves having a cross-sectional configuration complementary to that of said slat ribs so that said strip is secured in said slat groove, end caps for said slat elements, each end cap having laterally spaced portions received in the downwardly open cavities adjacent an end portion of an associated slat element, each end cap having an abutment to close the open end of said slat groove, said strip having an end portion spaced from the end portion of said slat and defining a longitudinally extending gap between said strip end portion and said end cap abutment, a tie-down cleat having a lower portion slidably received in said gap, and more particularly in said slat groove, said tie-down cleat lower portion having a cross-sectional shape that includes longitudinally extending grooves to receive said ribs and secure said tie-down cleat between said end cap abutment and said strip end portion, and single fastening means securing said end cap and slat element to the vehicle surface, said tie-down cleat being supported solely by said grooves in said slat and held between said strip and said tie-down cleat.

2. The article carrier as set forth in claim 1 further characterized by an elongated gasket element between said slat element and said vehicle roof, said end cap having a portion underlying said slat element and said fastening means comprising a sheet metal screw provided in aligned openings in said slat element and said underlying end cap portions.

3. The article carrier as set forth in claim 2 wherein said elastomeric strip is made from a vinyl plastic but wherein said lower portion includes a concave bottom surface, said tiedown cleat being made from a vinyl plastic material and having its lower portion with a convex bottom surface to provide said lower portion with a more rigid cross-sectional shape than that of said rail.

4. The article carrier as set forth in claim 3 wherein said cleat upper portion is generally T-shaped with the top of the T aligned with the longitudinal direction of said elongated slat.

* * * * *